United States Patent
Seo et al.

(10) Patent No.: US 10,344,998 B2
(45) Date of Patent: Jul. 9, 2019

(54) AIR CONDITIONER

(71) Applicant: LG ELECTRONICS INC., Seoul (KR)

(72) Inventors: Seokbae Seo, Seoul (KR); Kwangman Kim, Seoul (KR); Yongho Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 15/244,487

(22) Filed: Aug. 23, 2016

(65) Prior Publication Data

US 2017/0063249 A1    Mar. 2, 2017

(30) Foreign Application Priority Data

Aug. 31, 2015 (KR) .................. 10-2015-0122850

(51) Int. Cl.
 *F24F 11/00* (2018.01)
 *F25B 49/00* (2006.01)
 (Continued)

(52) U.S. Cl.
 CPC ............ *F24F 11/30* (2018.01); *F04D 19/002* (2013.01); *F24F 1/20* (2013.01); *F24F 5/001* (2013.01);
 (Continued)

(58) Field of Classification Search
 CPC ............ F24F 11/02; F24F 11/30; F24F 5/001; F24F 11/89; F24F 1/20; F25B 13/00
 See application file for complete search history.

(56) References Cited

U.S. PATENT DOCUMENTS

| | | | |
|---|---|---|---|
| 7,726,583 B2 * | 6/2010 | Maekawa | F24F 1/0003 236/51 |
| 2008/0092570 A1 * | 4/2008 | Choi | F24F 11/30 62/157 |

(Continued)

FOREIGN PATENT DOCUMENTS

| | | |
|---|---|---|
| CN | 101270907 | 9/2008 |
| CN | 101388565 | 3/2009 |

(Continued)

OTHER PUBLICATIONS

Korean Notice of Allowance dated May 1, 2017 issued in Application No. 10-2015-0122850.

(Continued)

*Primary Examiner* — Rexford N Barnie
*Assistant Examiner* — Rasem Mourad
(74) *Attorney, Agent, or Firm* — Ked & Associates, LLP

(57) ABSTRACT

An air conditioner including indoor and outdoor devices is provided. The indoor device may include a first connector including a first AC power terminal, a first communication terminal, and a first neutral terminal, a first relay connected between the first AC power terminal and the first communication terminal, and a first communication device connected to the first communication terminal. The outdoor device may include a second connector including a second AC power terminal, a second communication terminal, and a second neutral terminal, a second relay having a first terminal connected to the second communication terminal, a third relay having a first terminal connected to the second AC power terminal, a voltage step-down device and a converter connected to second terminals of the second and third relays, a communication voltage output connected to the second terminals of the second and third relays, and a second communication device connected between the com- (Continued)

munication voltage output and the second communication terminal.

9 Claims, 11 Drawing Sheets

(51) Int. Cl.

| | | |
|---|---|---|
| *F24F 11/30* | (2018.01) | |
| *F24F 1/20* | (2011.01) | |
| *F04D 19/00* | (2006.01) | |
| *F24F 5/00* | (2006.01) | |
| *F25B 13/00* | (2006.01) | |
| *H02M 7/00* | (2006.01) | |
| *H02M 7/42* | (2006.01) | |
| *H02M 7/5387* | (2007.01) | |
| *F24F 11/62* | (2018.01) | |
| *F24F 11/89* | (2018.01) | |
| *F24F 11/46* | (2018.01) | |

(52) U.S. Cl.
CPC ............. *F24F 11/62* (2018.01); *F24F 11/89* (2018.01); *F25B 13/00* (2013.01); *H02M 7/003* (2013.01); *H02M 7/42* (2013.01); *H02M 7/53875* (2013.01); *F24F 11/46* (2018.01)

(56) References Cited

U.S. PATENT DOCUMENTS

| | | | |
|---|---|---|---|
| 2011/0046791 A1* | 2/2011 | Sakae | F24F 11/30 700/276 |
| 2011/0132899 A1* | 6/2011 | Shimomugi | H02M 3/1584 219/620 |
| 2013/0067941 A1* | 3/2013 | Lee | F24F 11/30 62/126 |
| 2015/0013362 A1* | 1/2015 | Yumoto | F24F 11/30 165/237 |
| 2016/0131387 A1* | 5/2016 | Sawada | H02H 3/253 62/158 |
| 2016/0238300 A1* | 8/2016 | Makino | H02M 1/36 |

FOREIGN PATENT DOCUMENTS

| | | | |
|---|---|---|---|
| CN | 201887660 | | 6/2011 |
| CN | 102287889 | | 12/2011 |
| CN | 103017259 | | 4/2013 |
| CN | 104101033 | | 10/2014 |
| EP | 1 795 823 | | 6/2007 |
| EP | 2 570 745 | | 3/2013 |
| JP | 2010-054065 | | 3/2010 |
| JP | 2010054065 A | * | 3/2010 |
| JP | 2010-243051 | | 10/2010 |
| JP | 2012-117704 | | 6/2012 |
| JP | 2014-202459 | | 10/2014 |
| JP | 2015-127627 | | 7/2015 |
| KR | 10-0836821 | | 6/2008 |

OTHER PUBLICATIONS

European Search Report dated Jan. 19, 2017.
Chinese Office Action dated Sep. 28, 2018 with English Translation.

* cited by examiner

AIR CONDITIONER

CROSS-REFERENCE TO RELATED APPLICATION(S)

This application claims priority to Korean Patent Application No. 10-2015-0122850, filed in Korea on Aug. 31, 2015 in the Korean Intellectual Property Office, the disclosure of which is incorporated herein by reference.

BACKGROUND

1. Field

An air conditioner is disclosed herein.

2. Background

An air conditioner is configured to discharge cool or hot air into a room to adjust an indoor temperature and to purify indoor air, thereby providing a comfortable indoor environment for users. In general, the air conditioner includes an indoor unit or device installed in a room and an outdoor unit or device that supplies a refrigerant to the indoor device. The indoor device includes an indoor heat exchanger. The outdoor device includes a compressor and an outdoor heat exchanger.

BRIEF DESCRIPTION OF THE DRAWINGS

Embodiments will be described in detail with reference to the following drawings in which like reference numerals refer to like elements, and wherein.

DETAILED DESCRIPTION

Figure 1:
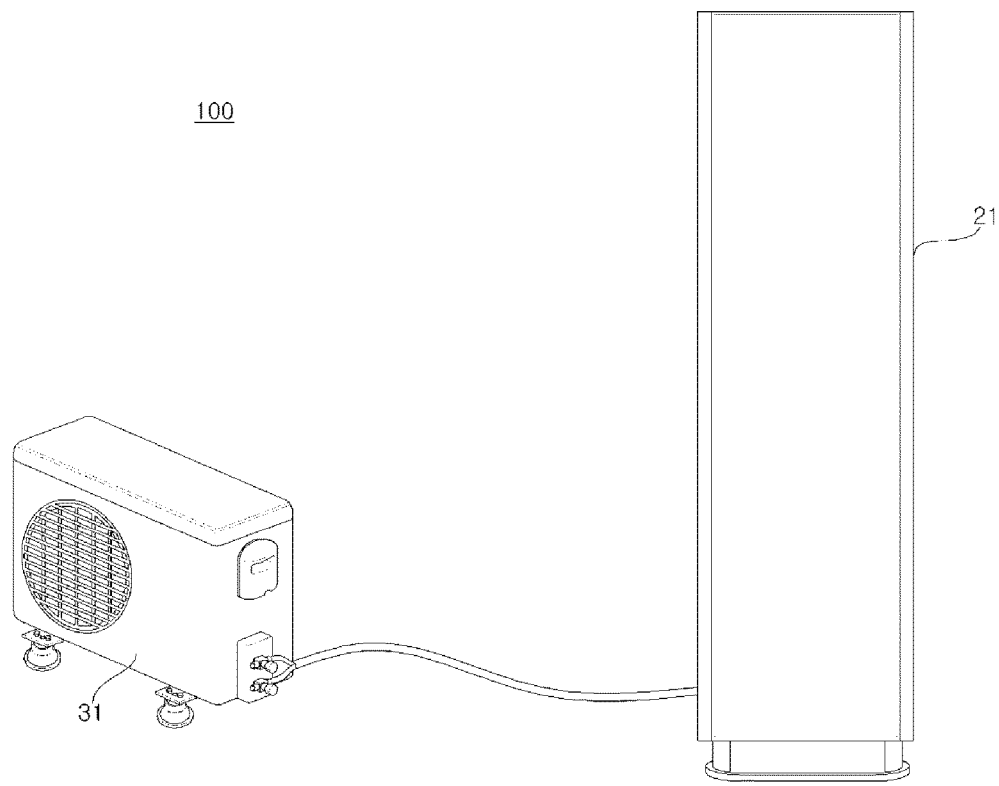
FIG. 1 is a schematic diagram of an air conditioner according to an embodiment.

Reference will now be made in detail to embodiments, examples of which are illustrated in the accompanying drawings. Where possible, like reference numerals have been used to indicate like elements, and repetitive disclosure has been omitted.

The suffixes "module" and "unit" in elements used in description below are given only in consideration of ease in preparation of the specification and do not have specific meanings or functions. Therefore, the suffixes "module" and "unit" may be used interchangeably.

FIG. 1 is a schematic diagram of an air conditioner according to an embodiment. As illustrated in FIG. 1, an air conditioner 100 according to an embodiment may include an indoor unit or device 21 and an outdoor unit or device 31 connected to the indoor device 21.

The indoor device 21 of the air conditioner 100 may be any one of stand type, wall mount type, or ceiling type air conditioners. In FIG. 1, the stand type indoor device 21 is illustrated. The air conditioner 100 may further include at least one of a ventilator, an air purifier, a humidifier, or a heater, which may be operatively connected to the indoor device 21 and the outdoor device 31.

The outdoor device 31 may include a compressor (not shown) that compresses a refrigerant, an outdoor heat exchanger (not shown) that performs heat exchange between the refrigerant and outdoor air, an accumulator (not shown) that extracts a gaseous refrigerant component from the refrigerant and supplies the extracted gaseous refrigerant component to the compressor, and a four-way valve (not shown) that changes a flow path of the refrigerant based on a heating operation. In addition, while the outdoor device 31 may further include a plurality of sensors, a valve, and an oil collector, descriptions thereof have been omitted.

The outdoor device 31 may operate compressors and outdoor heat exchangers included therein to compress the refrigerant or perform heat exchange based on setting conditions and to supply the compressed or heat-exchanged refrigerant to the indoor device 21. The outdoor device 31 may be driven according to a demand of a remote controller (not shown) or the indoor device 21. As a cooling/heating capacity of the air conditioner 100 may vary based on the indoor device 21, which is driven, a number of driven outdoor devices and a number of driven compressors installed in outdoor devices may be changed.

In this case, the outdoor device 31 may supply the compressed refrigerator to the connected indoor device 21. The indoor device 21 may receive the refrigerant from the outdoor device 31 to discharge cool or hot air into a room. The indoor device 21 may include an indoor heat exchanger (not shown), an indoor fan (not shown), an expansion valve (not shown) that expands the refrigerant, and a plurality of sensors (not shown).

The outdoor device 31 and the indoor device 21 may be connected to each other via communication cables to exchange data with each other. The outdoor device 31 and the indoor device 21 may be connected to the remote controller (not shown) by wires or wirelessly to operate according to a control of the remote controller (not shown).

A remote controller (not shown) may be connected to the indoor device 21 to allow a user to input a control command to control the indoor device 21 and to receive and display state information on the indoor device 21. In this case, the remote controller may communicate with the indoor device 21 in a wired or wireless manner according to how the remote controller is connected to the indoor device 21.

Figure 2:
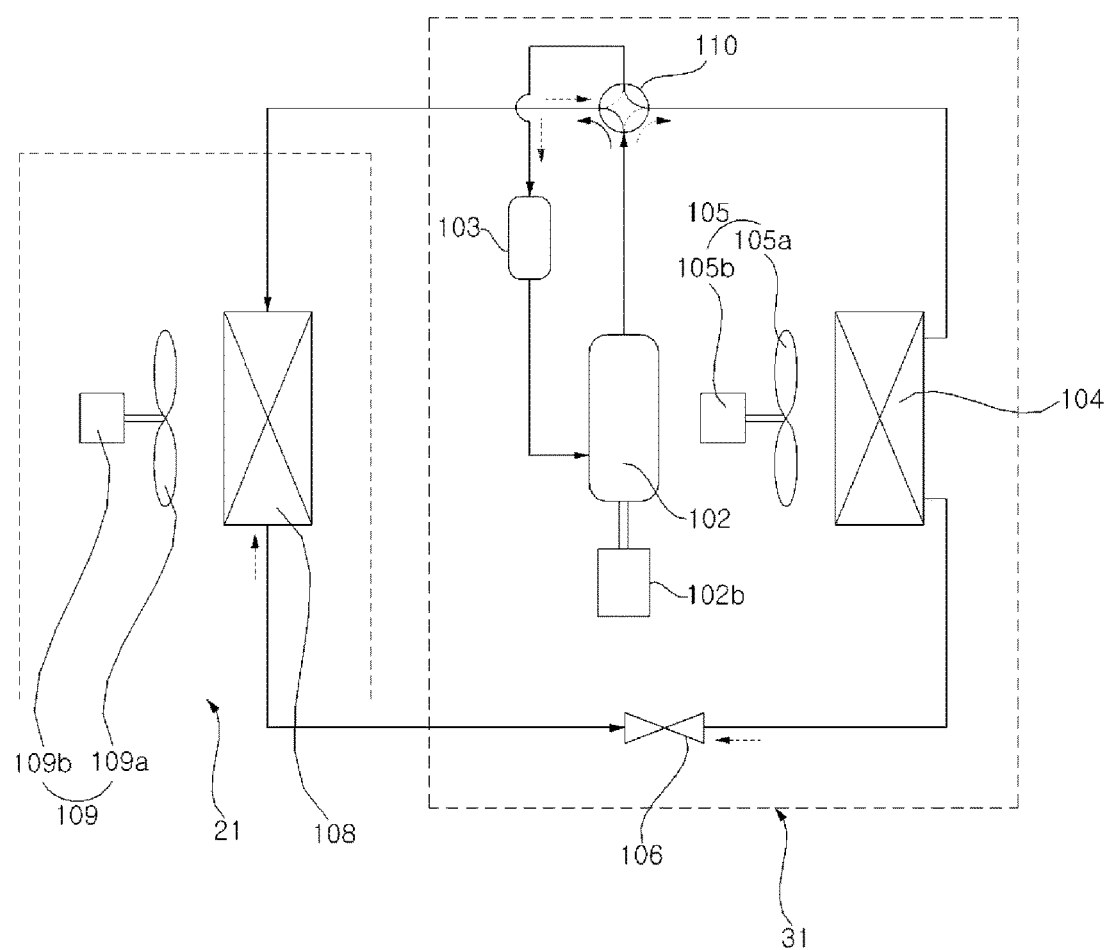
FIG. 2 is a schematic diagram view of an outdoor unit or device and an indoor unit or device of FIG. 1.

FIG. 2 is a schematic device of the outdoor device and the indoor device shown in FIG. 1. Referring to FIG. 2, the air conditioner 100 may be broadly divided into the indoor device 21 and the outdoor device 31.

The outdoor device 31 may include a compressor 102 that compresses a refrigerant, a compressor motor 102b that drives the compressor 102, an outdoor heat exchanger 104 that dissipates heat from the compressed refrigerant, an outdoor blower 105 including an outdoor fan 105a provided at one side of the outdoor heat exchanger 104 to accelerate heat dissipation of the refrigerant and a motor 105b that rotates the outdoor fan 105a, an expansion device or valve 106 that expands the condensed refrigerant, a cooling/heating switching valve or a four-way valve 110 that changes a flow path of the compressed refrigerant, and an accumulator 103 that temporarily stores the gaseous refrigerant to remove moisture and foreign particles from the refrigerant and supplies the refrigerant at a predetermined pressure to the compressor 102. The indoor device 21 may include an indoor heat exchanger 108 provided in a room to perform a cooling/heating function, and an indoor blower 109 including an indoor fan 109a provided at one side of the indoor heat exchanger 108 to accelerate heat dissipation of the refrigerant and an indoor fan motor 109b that rotates the indoor fan 109a.

At least one indoor heat exchanger 108 may be provided. At least one of an inverter compressor or a constant speed compressor may be used as the compressor 102.

The air conditioner 100 may be configured as a cooler that cools the room or may be configured as a heat pump that cools or heats the room.

The outdoor fan 105a in the outdoor device 31 may be driven by an outdoor fan drive (200 of FIG. 3) that drives the motor 105b. The compressor 102 in the outdoor device 31 may be driven by a compressor drive (113 of FIG. 3) that drives the compressor motor 102b. The indoor fan 109a in the indoor device 21 may be driven by an indoor fan drive (300 of FIG. 3) that drives the indoor fan motor 109b.

Figure 3:
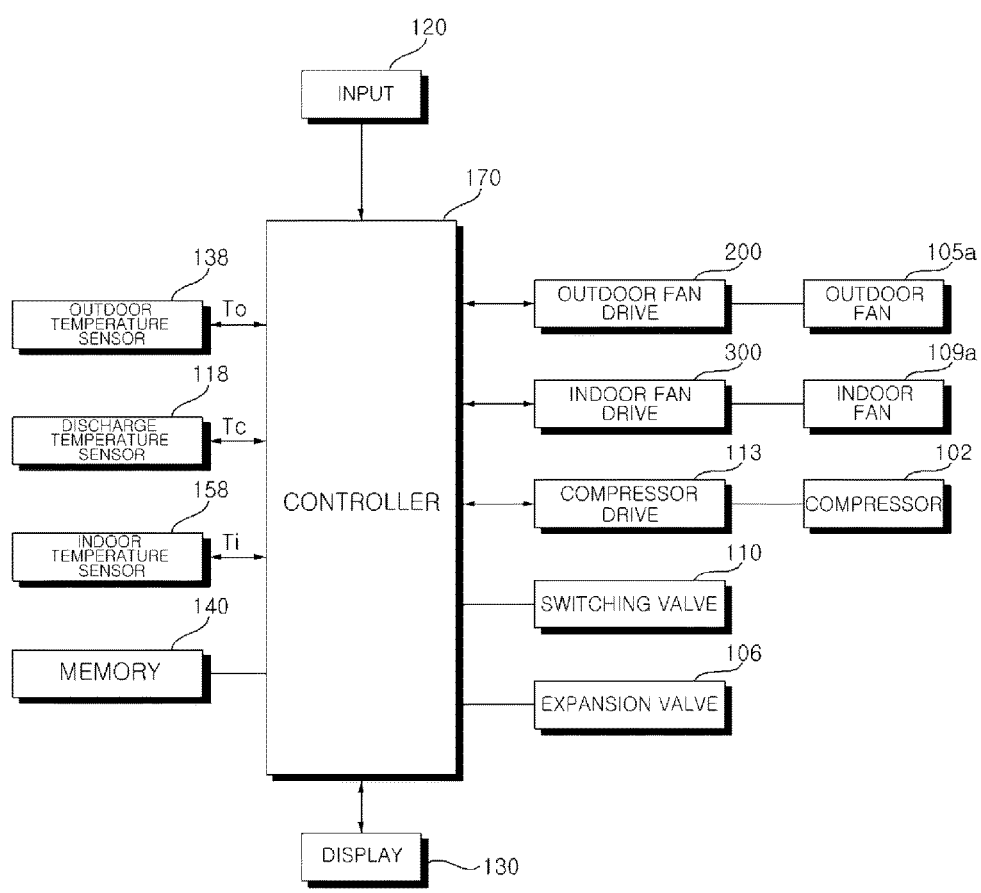
FIG. 3 is a schematic internal block diagram of the air conditioner of FIG.

FIG. 3 is a schematic internal block diagram of the air conditioner of FIG. 1. Referring to FIG. 3, the air conditioner 100 may includes compressor 102, outdoor fan 105a, indoor fan 109a, a controller 170, a discharge temperature sensing unit or sensor 118, an outdoor temperature sensing unit or sensor 138, an indoor temperature sensing unit or sensor 158, and a memory 140. The air conditioner 100 may further include compressor drive 113, outdoor fan motor drive 200, indoor fan motor drive 300, switching valve 110, expansion valve 106, a display unit or display 130, and an input unit or input 120. For description of the compressor 102, the outdoor fan 105a, and the indoor fan 109a, refer to FIG. 2.

The input 120 may include a plurality of manipulation buttons. The input 120 may transmit a signal for an operation target temperature of the air conditioner 100 input therethrough to the controller 170.

The display 130 may display an operation state of the air conditioner 100. The memory 140 may store data necessary to operate the air conditioner 100. For example, the memory 140 may store data regarding a first level and a second level among phase current levels for determining an intensity of external wind.

The discharge temperature sensor 118 may sense a refrigerant discharge temperature Tc at the compressor 102 and transmit a signal for the sensed refrigerant discharge temperature Tc to the controller 170. The outdoor temperature sensor 138 may sense a temperature around the outdoor device 31 of the air conditioner 100, that is, an outdoor temperature To. The outdoor temperature sensor 138 may transmit a signal for the sensed outdoor temperature To to the controller 170.

The indoor temperature sensor 158 may sense a temperature around the indoor device 21 of the air conditioner 100, that is, an indoor temperature Ti. The outdoor temperature sensor 138 may transmit a signal for the sensed indoor temperature Ti to the controller 170.

The controller 170 may control the air conditioner 100 to be operated based on at least one of the sensed refrigerant discharge temperature Tc, the sensed outdoor temperature To, or the sensed indoor temperature Ti, and the input target temperature. For example, the controller 170 may calculate a final target overheat degree and control the air conditioner 100 to be operated based on the calculated final target overheat degree.

As shown in FIG. 3, the controller 170 may control the compressor drive 113, the outdoor fan drive 200, and the indoor fan drive 300 to drive the compressor 102, the outdoor fan 105a, and the indoor fan 109a, respectively. For example, the controller 170 may output respective speed command value signals to the compressor drive 113, the outdoor fan drive 200, and the indoor fan drive 300, based on the target temperature. The compressor motor 102b, the outdoor fan motor 105b, and the indoor fan motor 109b may be operated at target rotational speeds based on the speed command value signals.

The controller 170 may control overall operation of the air conditioner 100 in addition to control of the compressor drive 113, the outdoor fan drive 200, or the indoor fan drive 300. For example, the controller 170 may control an operation of the cooling/heating switching valve or the four-way valve 110. In addition, the controller 170 may control operation of the expansion valve 106.

Figure 4:
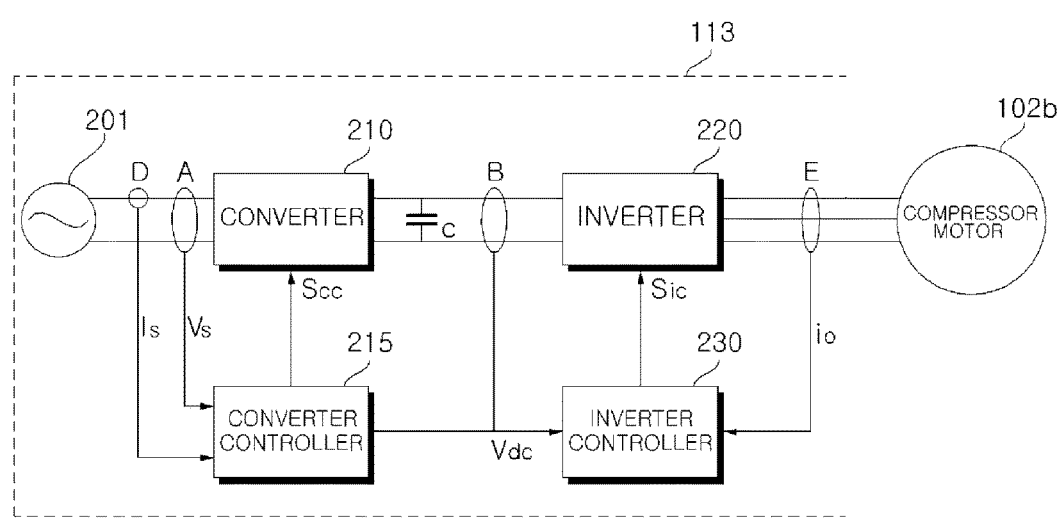
FIG. 4 is a block diagram of a compressor drive shown in FIG. 3.

FIG. 4 is a block diagram of the compressor drive shown in FIG. 3. Referring to FIG. 4, the compressor drive 113 may include an inverter 220 that outputs three-phase AC current to the compressor motor 250, an inverter controller 230 that controls the inverter 220, a converter 210 that supplies DC power to the inverter 220, a converter controller 215 that controls the converter 210, and a DC terminal capacitor C connected between the converter 210 and the inverter 220. The compressor drive 113 may further include a DC terminal voltage detector B, an input voltage detector A, an input current detector D, and an output current detector E.

The compressor drive 200 may convert an AC power received from a power system and supply the converted power to the compressor motor 102b. Therefore, the drive 200 may be referred to as "a power conversion device", or "power converter".

The converter 210 may convert an input AC power into a DC power. The converter 210 may include only a rectifier (not shown) or may include both the rectifier and a switching element.

The rectifier (not shown) may rectify an AC power supplied by a single-phase AC power source 201 and output the rectified power. The rectifier (not shown) may include two pairs of upper and lower arm diodes, which may be connected in parallel to each other, each pair including an upper arm diode element and a lower arm diode element, which may be serially connected to each other. That is, the upper and lower arm diodes may be connected to each other in the form of a bridge.

When the converter 210 includes the switching element, the converter 210 may be a boost converter. That is, the converter 210 may include an inductor, a diode, and a switching element between the rectifier (not shown) and the inverter 220, in which the inductor and the diode are serially connected to each other and the switching element is connected between the inductor and the diode.

In a case in which the converter 210 includes the switching element, the converter controller 215 may control turn on timing of the switching element. Consequently, the converter controller 215 may output a converter switching control signal Scc for turn on timing of the switching element.

The converter controller 215 may receive an input voltage Vs and an input current Is from the input voltage detector A and the input current detector D, respectively. The input voltage detector A may detect the input voltage Vs from the input AC power supplied by the input AC power source 201. For example, the input voltage detector A may be provided at a front of the rectifier (not shown).

The input voltage detector A may include a resistor element and an operational amplifier (OP AMP) for voltage detection. The detected input voltage Vs may be applied to the converter controller 215 in the form of a pulse type discrete signal to generate the converter switching control signal Scc. On the other hand, the input voltage detector A may also detect a zero crossing point of the input voltage.

The input current detector D may detect the input current Is from the input AC power supplied by the input AC power source 201. More specifically, the input current detector D may be provided at the front of the rectifier (not shown).

The input current detector D may include a current sensor, a current transformer (CT), and a shunt resistor for current detection. The detected input current Is may be applied to the converter controller 215 in the form of a pulse type discrete signal to generate the converter switching control signal Scc.

The DC terminal voltage detector B may detect DC voltage Vdc of the DC terminal capacitor C. A resistor element, an OP AMP, for example, may be used to detect power. The detected voltage Vdc of the DC terminal capacitor C may be applied to the inverter controller 230 in the form of a pulse type discrete signal. An inverter switching control signal Sic may be generated based on the DC voltage Vdc of the DC terminal capacitor C. In addition, the detected DC voltage Vdc may be applied to the converter controller 215 to generate the converter switching control signal Scc.

The inverter 220 may include a plurality of inverter switching elements. The inverter 220 may convert the DC power Vdc smoothed by on/off operations of the switching elements into a three phase AC power having a predetermined frequency and output the three phase AC power to the compressor motor 102b, which may be a three phase motor.

Then, the inverter 220 may supply an inverter power to the compressor motor 102b, which is a load. The inverter power is a power necessary for the compressor motor 102b, which is a load. The inverter power may follow a necessary target power.

The inverter 220 may include a plurality of switching elements. For example, the inverter 220 may include upper arm switching elements Sa, Sb, and Sc and lower arm switching elements S'a, S'b, and S'c, each pair of an upper arm switching element and a lower arm switching element being serially connected and three pairs of upper and lower arm switching elements Sa and S'a, Sb and S'b, and Sc and S'c being connected in parallel. Diodes may be connected in anti-parallel to the respective switching elements Sa, S'a, Sb, S'b, Sc, and S'c.

The inverter controller 230 may output the inverter switching control signal Sic to the inverter 220 so as to control a switching operation of the inverter 220. The inverter switching control signal Sic may be output based on an output current io, which is a three phase current flowing into the compressor motor 102b, and the DC terminal voltage Vdc at both ends of the DC terminal capacitor. The three-phase output current io may be detected by the output current detector E and the DC terminal voltage Vdc may be detected by the DC terminal voltage detector B.

The output current detector E may detect the output current io flowing between the inverter 220 and the compressor motor 102b. That is, the output current detector E may detect current flowing into the compressor motor 102b. The output current detector E may detect all output currents $i_a$, $i_b$, and $i_c$ of respective phases of the compressor motor 102b. Alternatively, the output current detector E may detect output currents of two phases using three-phase balance.

The output current detector E may be provided between the inverter 220 and the compressor motor 102b. A current transformer (CT), a shunt resistor, for example, may be used for current detection.

The output inverter switching control signal Sic may be converted into a gate driving signal by a gate driver (not shown) and then input to gates of the respective switching elements of the inverter 220. As a result, the switching elements Sa, S'a, Sb, S'b, Sc, and S'c of the inverter 220 may perform switching operations.

Figure 5A:
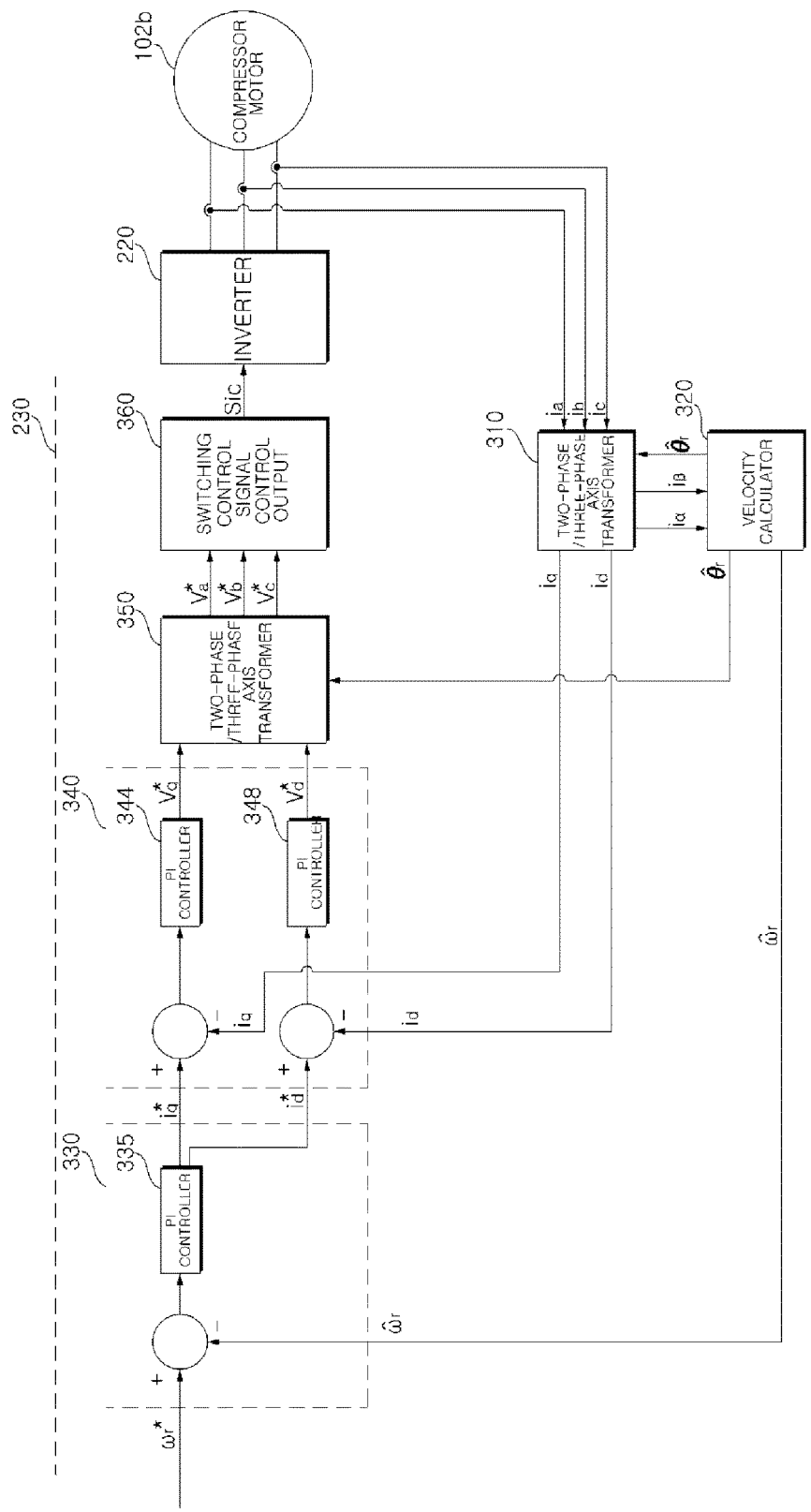
FIG. 5A is an internal block diagram of an inverter controller shown in FIG. 4.

FIG. 5A is an internal block diagram of the inverter controller shown in FIG. 4. Referring to FIG. 5A, the inverter controller 230 may include an axis transformer 310, a velocity calculator 320, a current command generator 330, a voltage command generator 340, an axis transformer 350, and a switching control signal output 360.

The axis transformer 310 may receive the output currents $i_a$, $i_b$, and $i_c$ detected by the output current detector E and transform the same into two-phase currents $i_\alpha$ and $i_\beta$ of the stationary coordinate system. The axis transformer 310 may transform the two-phase currents $i_\alpha$ and $i_\beta$ of the stationary coordinate system into two-phase currents $i_d$ and $i_q$ of the rotating coordinate system.

The velocity calculator 320 may output a calculated location $\hat{\theta}_r$ and a calculated velocity based on the two-phase currents $i_\alpha$ and $i_\beta$ of the stationary coordinate system transformed by the axis transformer 310. The current command generator 330 may generate a current command value $i^*_q$ based on the calculated velocity $\hat{\omega}_r$ and a velocity command value $\omega^*_r$. For example, the current command generator 330 may generate the current command value $i^*_q$ through proportional integral (PI) control of a PI controller 335 based on the calculated velocity $\hat{\omega}_r$ and the velocity command value $\omega^*_r$. While FIG. 5A illustrates the q-axis current command value $i^*_q$ as a current command value, the current command generator 330 may further generate a d-axis current command value $i^*_d$. The d-axis current command value $i^*_d$ may be set to 0. The current command generator 330 may further include a limiter (not shown) that limits a level of the current command value $i^*_q$ so as not to exceed an allowable range.

The voltage command generator 340 may generate d-axis and q-axis voltage command values $v^*_d$ and $v^*_q$ based on the d-axis and q-axis currents $i_d$ and $i_q$, which have been axis-transformed into two-phase currents of the rotating coordinate system by the axis transformer 310 and based on the current command values $i^*_d$ and $i^*_q$ generated by the current command generator 330. For example, the voltage command generator 340 may generate the q-axis voltage command value $v^*_q$ through PI control of a PI controller 344 based on a difference between the q-axis current $i_q$ and the q-axis current command value $i^*_q$. In addition, the voltage command generator 340 may generate the d-axis voltage command value $v^*_d$ through PI control of a PI controller 348 based on a difference between the d-axis current $i_d$ and the d-axis current command value $i^*_d$. The voltage command generator 340 may further include a limiter (not shown) that limits levels of the d-axis and q-axis voltage command values $v^*_d$ and $v^*_q$ so as not to exceed an allowable range. The generated d-axis and q-axis voltage command values $v^*_d$ and $v^*_q$ may be input to the axis transformer 350.

The axis transformer 350 may receive the location calculated $\hat{\theta}_r$ by the velocity calculator 320 and the d-axis and q-axis voltage command values $v^*_d$ and $v^*_q$ generated by the voltage command generator 340 to implement axis conversion of the same. First, the axis transformer 350 may implement transformation of a two-phase rotating coordinate system into a two-phase stationary coordinate system. In this case, the location $\hat{\theta}_r$ calculated by the velocity calculator 320 may be used.

The axis transformer 350 may then perform transformation of the two-phase stationary coordinate system into a three-phase stationary coordinate system. Through this transformation, the axis transformer 350 may output three-phase output voltage command values $v^*_a$, $v^*_b$, and $v^*_c$.

The switching control signal output 360 may generate a pulse width modulation (PWM) based inverter switching control signal Sic based on the three-phase output voltage command values $v^*_a$, $v^*_b$, and $v^*_c$. The output inverter switching control signal Sic may be converted into a gate drive signal by a gate driver (not shown) and may then be input to gates of respective switching elements included in the inverter 220. Thereby, the respective switching elements Sa, S'a, Sb, S'b, Sc, and S'c of the inverter 420 may perform switching operations.

Figure 5B:
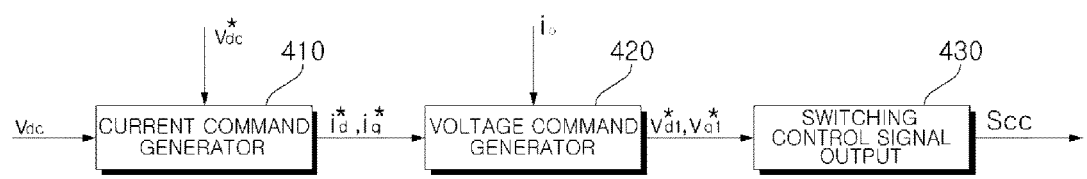
FIG. 5B is an internal block diagram of a converter controller shown in FIG. 3.

FIG. 5B is an internal block diagram of the converter controller shown in FIG. 3. Referring to FIG. 5B, the converter controller 215 may include a current command generator 410, a voltage command generator 420, and a switching control signal output 430.

The current command generator 410 may generate d-axis and q-axis current command values $i^*_d$ and $i^*_q$ through a PI controller based on the DC terminal voltage Vdc detected by the output voltage detector B, for example, the DC terminal voltage detector B, and based on a DC terminal voltage command value $V^*_{dc}$. The voltage command generator 420 may generate d-axis and q-axis voltage command values $v^*_d$ and $v^*_q$ through a PI controller based on the d-axis and q-axis current command values $i^*_d$ and $i^*_q$ and an input current $i_s$ detected by the input current detector D. The switching control signal output 430 may output the converter switching control signal Scc for driving a switching element in the converter 210 of FIG. 4 based on the d-axis and q-axis voltage command values $v^*_d$ and $v^*_q$.

Figure 6:
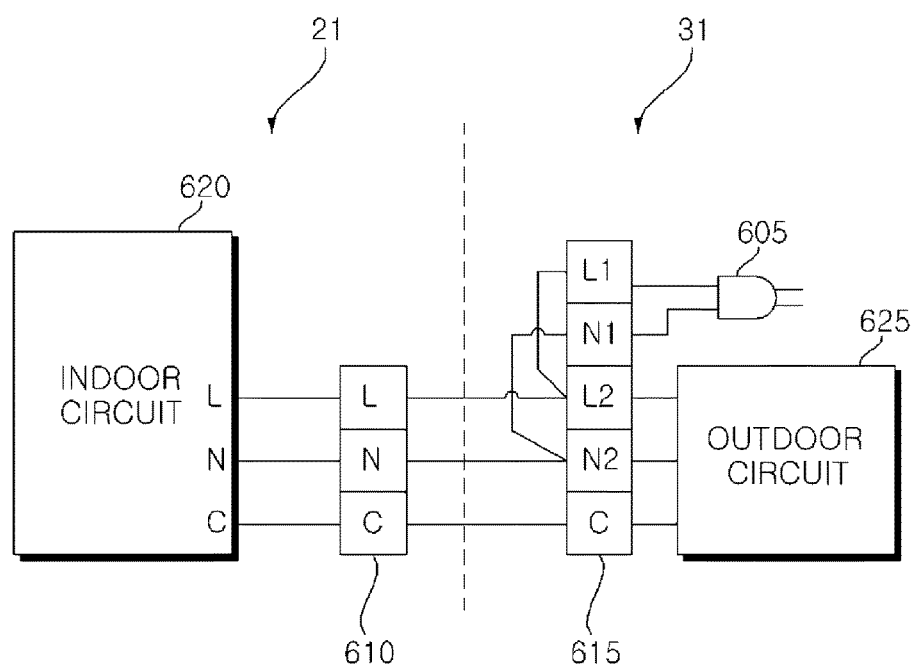
FIG. 6 is a view illustrating power connection of an indoor device and an outdoor device.

FIG. 6 is a view illustrating power connection of an indoor device and an outdoor device. Referring to FIG. 6, the indoor device 21 may include an indoor connector 610 connected to an indoor circuit 620 and the outdoor device 31 may include an outdoor connector 615 connected to an outdoor circuit 625.

The indoor connector 610 may include an AC power terminal L, a communication terminal C, and a neutral terminal N. The outdoor connector 615 may include a first AC power terminal L1, a second AC power terminal L2, a first neutral terminal N1, a second neutral terminal N2, and a communication terminal C. The second AC power terminal L2, the second neutral terminal N2, and the communication terminal C of the outdoor connector 615 may be connected to the AC power terminal L, the neutral terminal N, and the communication terminal C of the indoor connector 610, respectively.

In a case of an outdoor insertion connection scheme in which a power plug 605 is connected to the connector 615, an AC power may be applied through the first AC power terminal L1 and the first neutral terminal N1 to the outdoor circuit 625. In addition, the AC power may be supplied to the indoor circuit 620 through the AC power terminal L and the neutral terminal N connected respectively to the second AC power terminal L2 and the second neutral terminal N2. Therefore, in a standby state in which the power plug 605 is connected to a power system but a power button does not operate, power consumption may occur due to the AC power supplied to the indoor circuit 620 and the outdoor circuit 625.

Embodiments disclosed herein propose a method of reducing power consumption in such a standby state. In particular, embodiments disclosed herein propose a method of reducing power consumption in a standby state using the outdoor insertion connection scheme.

Figure 7:
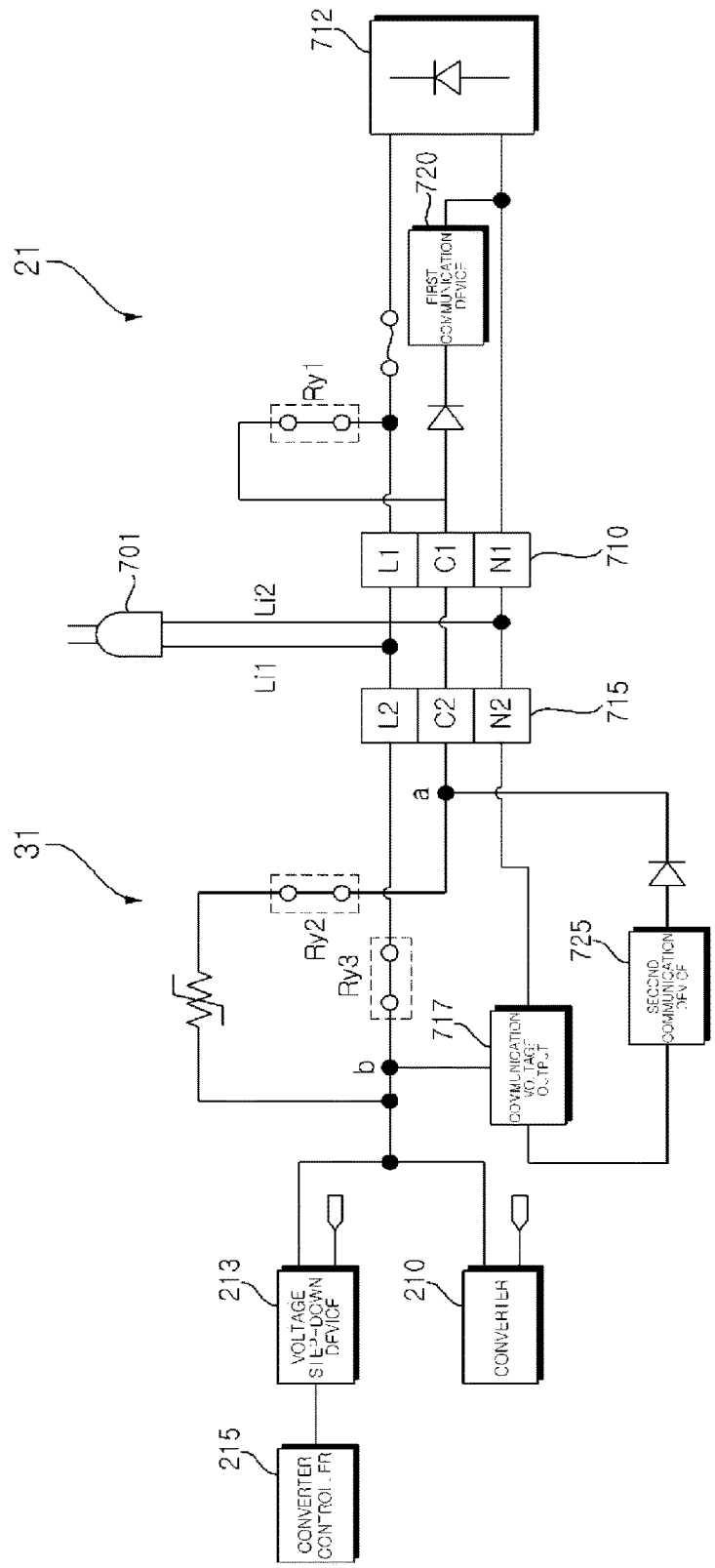
FIG. 7 is a circuit diagram illustrating power connection between an indoor device and an outdoor device according to an embodiment.

FIG. 7 is a circuit diagram illustrating power connection between an indoor device and an outdoor device according to an embodiment. Referring to FIG. 7, the indoor device 21 according to an embodiment may include a first connector 710 including a first AC power terminal L1, a first communication terminal C1, and a first neutral terminal N1, a first relay Ry1 connected between the first AC power terminal L1 and the first communication terminal C1, and a first communication unit or device 720 connected to the first communication terminal C1. The indoor device 21 may further include a rectifier 712 connected to the first AC power terminal L1.

The outdoor device 31 according to an embodiment may include a second connector 715 including a second AC power terminal L2, a second communication terminal C2, and a second neutral terminal N2 connected, respectively, to the first AC power terminal L1, the first communication terminal C1, and the first neutral terminal N1, a second relay Ry2 having a first terminal a connected to the second communication terminal C2, a third relay Ry3 having a first terminal connected to the second AC power terminal L2, a voltage step-down unit or device 213 and the converter 210, which may be connected to a second terminal b of the second relay Ry2 and a second terminal b of the third relay Ry3 and may be connected in parallel to each other, a communication voltage output 717 connected to the second terminal b of the second relay Ry2 and the second terminal b of the third relay Ry3 to output a communication voltage, and a second communication unit or device 725 connected between the communication voltage output 717 and the second communication terminal C2. The outdoor device 31 may further include the converter controller 215 operated by power received from the voltage step-down device 213.

A first power line Li1 electrically connected to a power plug 701 may be connected between the first AC power terminal L1 and the second AC power terminal L2. A second power line Li2 electrically connected to the power plug 701 may be connected between the first neutral terminal N1 and the second neutral terminal N2.

The converter controller 215 may perform on/off control or operation control of the second relay Ry2, the third relay Ry3, the voltage step-down device 213 and the converter 210, the communication voltage output 717, and the second communication device 725 of the outdoor device 31. The converter controller 215 may perform on/off control or operation control of the first relay Ry1 and the first communication device 720 of the indoor device 21. The third relay Ry3 may be a DC relay operated by DC power from the converter controller 215 or a DC power from the voltage step-down device 213.

Figure 8A:
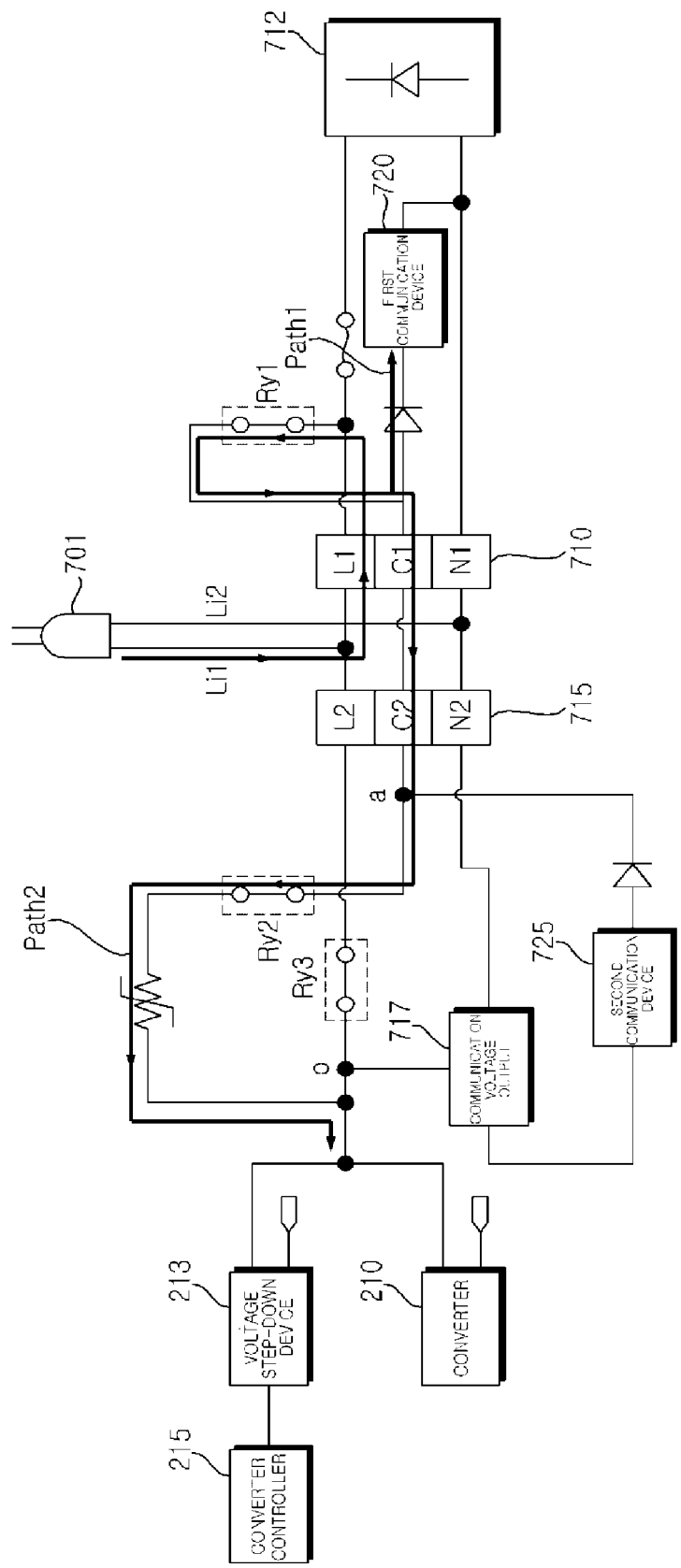
FIG. 8A and FIG. 8B are views referred to for explaining an operation of FIG. 7.
Figure 8B:
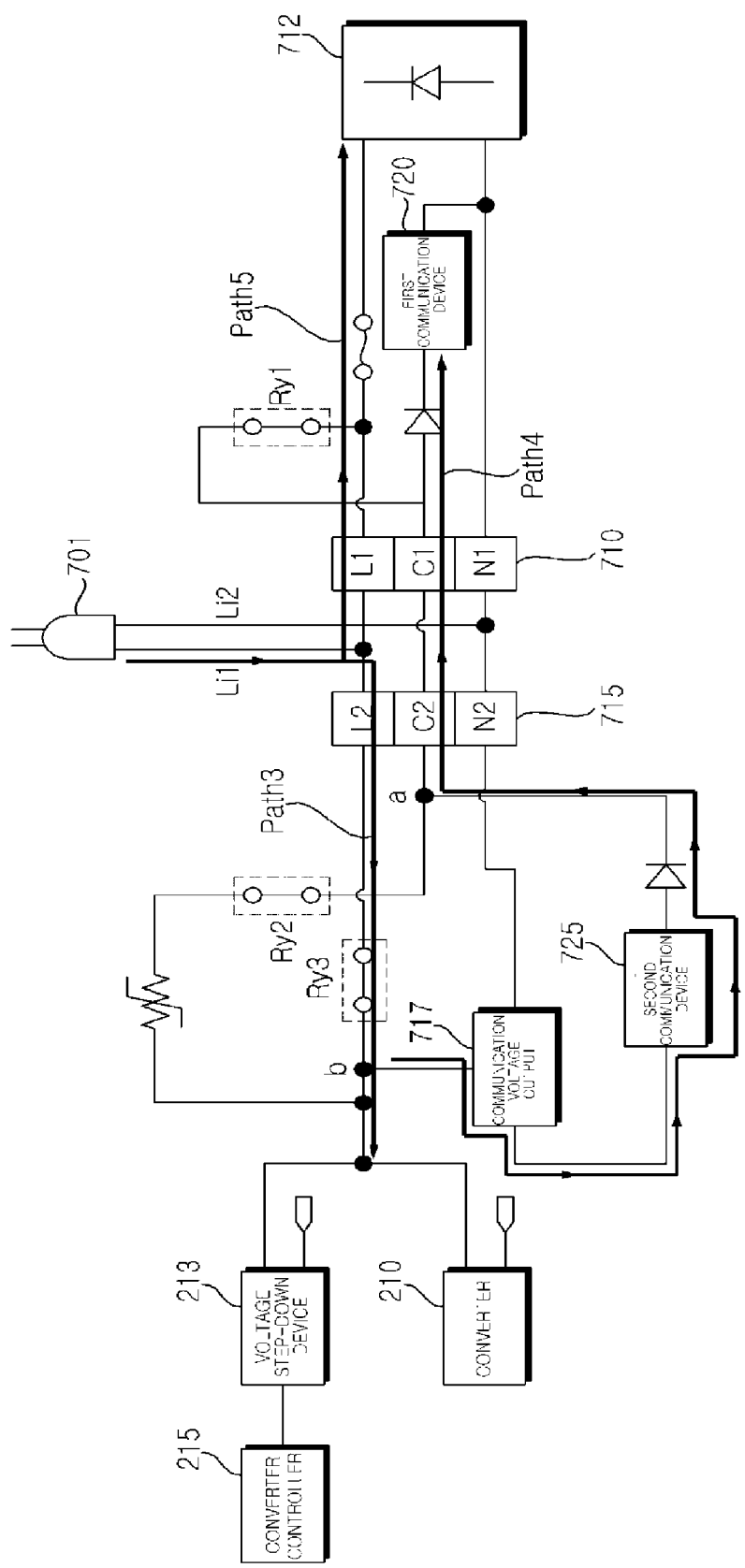

FIG. 8A and FIG. 8B are views referred to for explaining operation of FIG. 7. Referring to FIG. 8A, if the first relay Ry1 is turned on in a state in which an AC power is applied through the first power line Li1 connected between the first AC power terminal L1 and the second AC power terminal L2, the AC power through the first power line Li1 may be transmitted to the first communication device 720 and the second communication terminal C2 via the first communication terminal C1 from the first AC power terminal L1. A first current path Path1 may be formed from the first AC power terminal L1 to the first communication device 720 via the first communication terminal C1.

If the second relay Ry2 is turned on in a state in which an AC power is applied through the first power line Li1 connected between the first AC power terminal L1 and the second AC power terminal L2, the AC power through the first AC power terminal L1, the first communication terminal C1, and the second communication terminal C2 may be transmitted to the voltage step-down device 213 and the converter 210, thereby operating the voltage step-down device 213 and the converter 210. In this case, a second path Path2 may be formed through the first AC power terminal L1, the first communication terminal C1, the second communication terminal C2, and the second relay Ry2.

The converter controller 215 may be operated according to an operation power transmitted by the voltage step-down device 213 and may control the second relay Ry2 to be turned off and the third relay Ry3 to be turned on. Referring to FIG. 8B, if the second relay Ry2 is turned off and the third relay Ry3 is turned on after the voltage step-down device 213 and the converter 210 are operated, the AC power through the first power line Li1 may be transmitted to the voltage step-down device 213 and the converter 210 via the second AC power terminal L2 and the third relay Ry3, thereby operating the voltage step-down device 213 and the converter 210. In this case, a third path Path3 may be formed through the first power line Li1, the second AC power terminal L2, and the third relay Ry3.

The communication voltage output 717 may output a communication voltage according to operation of the voltage step-down device 213 and the converter 210. The output communication voltage may be transmitted to the first communication device 720 via the second communication device 725, the second communication terminal C2, and the first communication terminal C1.

In FIG. 8B, a fourth path Path4 may be formed up to the first communication device 720 via the communication voltage output 717, the second communication device 725, the second communication terminal C2, and the first communication terminal C1. The converter controller 215 may control the second relay Ry2 to be turned off and the third relay Ry3 to be turned on according to an operation power transmitted by the voltage step-down device 213. As such, the AC power through the first power line Li1 may be transmitted to the rectifier 712 through the first AC power terminal L1.

In FIG. 8B, a fifth current path Path5 may be formed through the first power line Li1 and the rectifier 712. In this way, if power is supplied to the indoor device 21 and the outdoor device 31, unnecessary power consumption does not occur in a standby mode. More particularly, power consumption of the outdoor device 31 may be reduced in a standby mode.

In addition, while the AC power may be supplied through the second relay Ry2, which may be a start relay, after the second relay Ry2 is turned off, the third relay Ry3 is turned on, and thus, the AC power is supplied through the third relay Ry3. Accordingly, during plug connection after the standby mode is ended, the AC power may be rapidly supplied.

Figure 9:
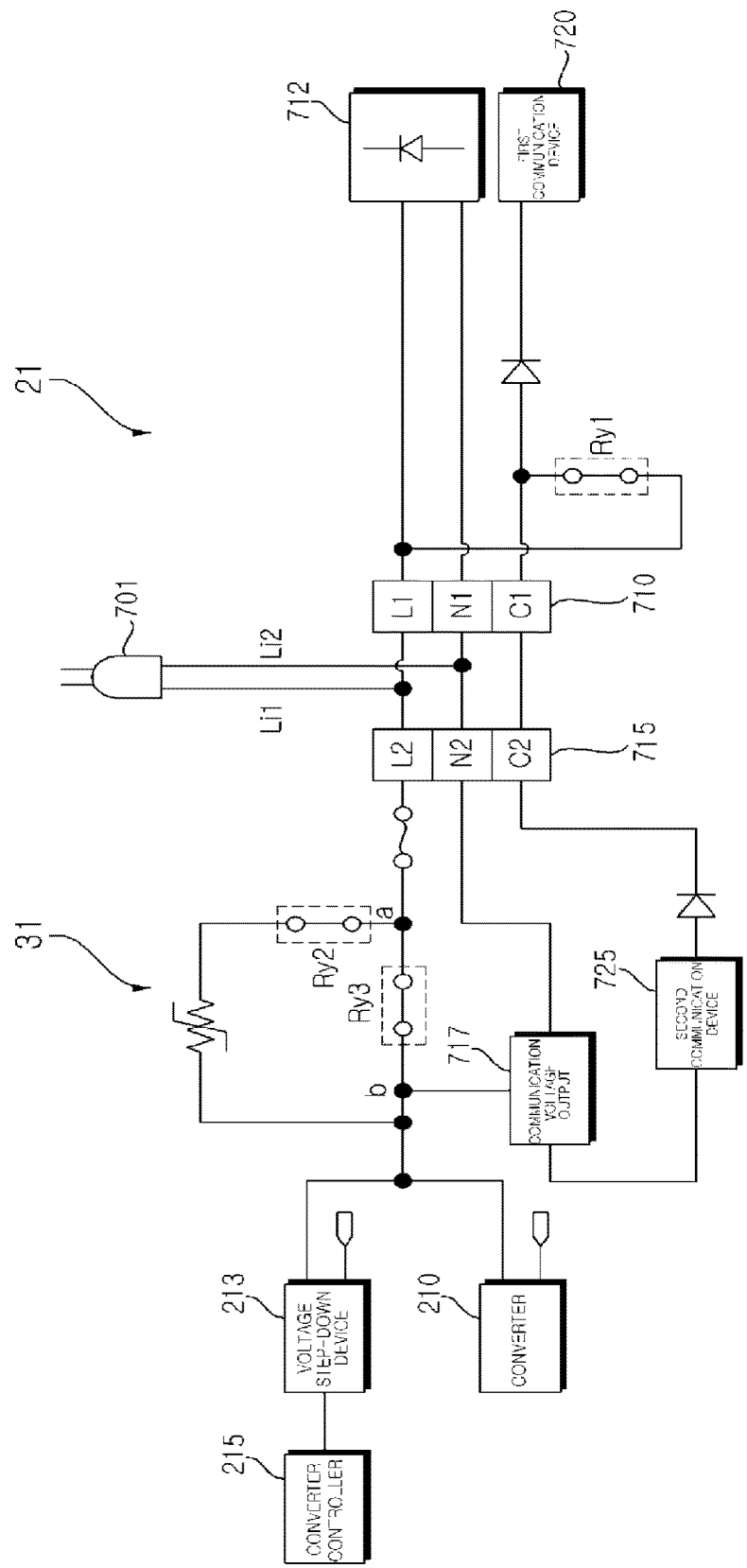
FIG. 9 is a circuit diagram illustrating power connection between an indoor device and an outdoor device according to another embodiment.

FIG. 9 is a circuit diagram illustrating power connection between an indoor device and an outdoor device according to another embodiment. While FIG. 9 is similar to FIG. 8A and FIG. 8B, there is a difference in a partial wiring relationship.

Referring to FIG. 9, the indoor device 21 according to this embodiment may include the first connector 710 including the first AC power terminal L1, the first communication terminal C1, and the first neutral terminal N1, the first relay Ry1 connected between the first AC power terminal L1 and the first communication terminal C1, and the first communication device 720 connected to the first communication terminal C1. The outdoor device 31 according to this embodiment may include the second connector 715 including the second AC power terminal L2, the second communication terminal C2, and the second neutral terminal N2 connected, respectively, to the first AC power terminal L1, the first communication terminal C1, and the first neutral terminal N1, the second relay Ry2 having a first terminal a connected to the second AC power terminal L2, the third relay Ry3 having a first terminal connected to the second AC power terminal L2 and the first terminal a of the second relay Ry2, the voltage step-down device 213 and the converter 210, which may be connected to a second terminal b of the second relay Ry2 and a second terminal b of the third relay Ry3 and may be connected in parallel to each other, the communication voltage output 717 connected to the second terminal b of the second relay Ry2 and the second terminal b of the third relay Ry3 to output a communication voltage, and the second communication device 725 connected between the communication voltage output 717 and the second communication terminal C2. The outdoor device 31 may further include the converter controller 215 operated by power received from the voltage step-down device 213.

The first power line Li1 electrically connected to the power plug 701 may be connected between the first AC power terminal L1 and the second AC power terminal L2. The second power line Li2 electrically connected to the power plug 701 may be connected between the first neutral terminal N1 and the second neutral terminal N2.

The converter controller 215 may perform on/off control or operation control of the second relay Ry2, the third relay Ry3, the voltage step-down device 213 and the converter 210, the communication voltage output 717, and the second communication device 725 of the outdoor device 31. The converter controller 215 may perform on/off control or operation control of the first relay Ry1 and the first communication device 720 of the indoor device 21. The third relay Ry3 may be a DC relay operated by a DC power from the controller 215 or a DC power from the voltage step-down device 213.

An operation of FIG. 9 will be discussed hereinafter.

If the first relay Ry1 is turned on in a state in which an AC power is applied through the first power line Li1 connected between the first AC power terminal L1 and the second AC power terminal L2, the AC power through the first power line Li1 may be transmitted to the first communication device 720 via the first communication terminal C1 and the first relay Ry1 from the first AC power terminal L1. If the second relay Ry2 is turned on in a state in which an AC power is applied through the first power line Li1 connected between the first AC power terminal L1 and the second AC power terminal L2, the AC power through the first power line Li1 may be transmitted to the voltage step-down device 213 and the converter 210 via the second AC power terminal L2 and the second relay Ry2, thereby operating the voltage step-down device 213 and the converter 210. If the second relay Ry2 is turned off and the third relay Ry3 is turned on after the voltage step-down device 213 and the converter 210 are operated, the AC power through the first power line Li1 may be transmitted to the voltage step-down device 213 and the converter 210 via the second AC power terminal L2 and the third relay Ry3, thereby operating the voltage step-down device 213 and the converter 210.

The communication voltage output 717 may output a communication voltage according to an operation of the voltage step-down device 213 and the converter 210. The output communication voltage may be transmitted to the first communication device 720 via the second communication device 725, the second communication terminal C2, and the first communication terminal C1. If the second relay Ry2 is turned off and the third relay Ry3 is turned on after the voltage step-down device 213 and the converter 210 are operated, the AC power through the first power line Li1 may be transmitted to the rectifier 712 through the first AC power terminal L1.

Figure 10:
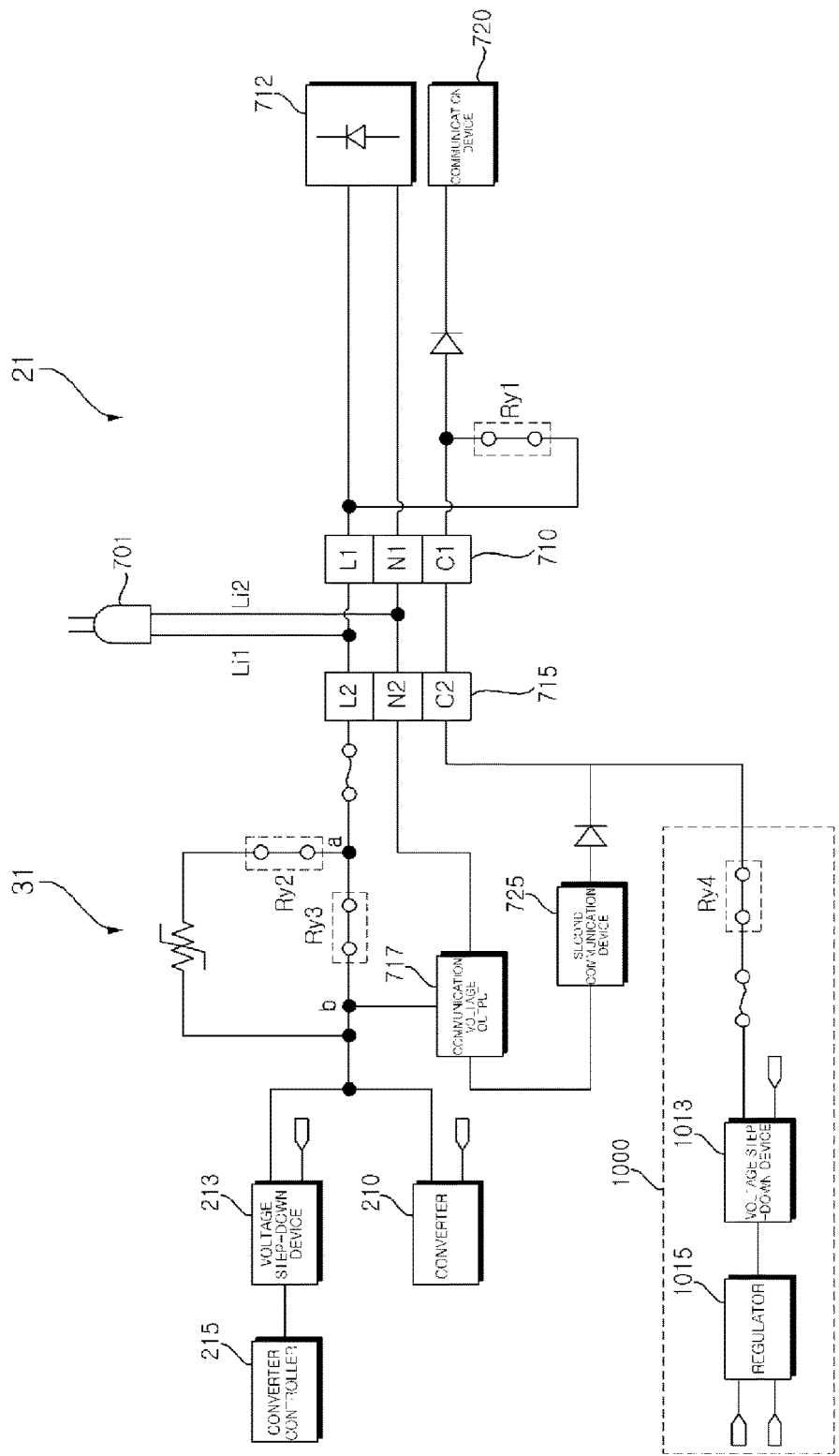
FIG. 10 is a circuit diagram illustrating power connection between an indoor device and an outdoor device according to a further embodiment.

FIG. 10 is a circuit diagram illustrating power connection between an indoor device and an outdoor device according to a further embodiment. FIG. 10 is similar to FIG. 9 except that an auxiliary power supply 1000 is further included in the outdoor device 31.

The auxiliary power supply 1000 may include a fourth relay Ry4 having a first terminal connected to the second communication terminal C2 and a second voltage step-down unit or device 1013 connected to a first terminal of the fourth relay Ry4. The auxiliary power supply 1000 may further include a regulator 1015 that regulates an output voltage supplied by the second voltage step-down device 1013.

If the first relay Ry1 is turned on in a state in which an AC power is applied through the first power line Li1 connected between the first AC power terminal L1 and the second AC power terminal L2, the AC power through the first power line Li1 may be transmitted to the auxiliary power supply 1000 via the first communication terminal C1 and the second communication terminal C2 from the first AC power terminal L1. If the fourth relay Ry4 of the auxiliary power supply 1000 is turned on, the second voltage step-down device 1013 may output a dropped voltage and the regulator 1015 may output a regulated power. For example, a DC voltage of about 5V may be output.

The regulated power may be supplied to the converter controller 215 to activate the converter controller 215. The converter controller 215 may control the second relay Ry2 to be turned on, and after a predetermined period of time, control the second relay Ry2 to be turned off and the third relay Ry3 to be turned on, as described above.

According to embodiments disclosed herein, an air conditioner is provided that may include an indoor unit or device and an outdoor unit or device. The indoor unit may include a first connection unit or connector including a first alternating current (AC) power terminal, a first communication terminal, and a first neutral terminal, a first relay connected between the first AC power terminal and the first communication terminal, and a first communication unit or device connected to the first communication terminal. The outdoor unit may include a second connection unit or connector including a second AC power terminal, a second communication terminal, and a second neutral terminal connected, respectively, to the first AC power terminal, the first communication terminal, and the first neutral terminal, a second relay having one or a first terminal connected to the second communication terminal, a third relay having one or a first terminal connected to the second AC power terminal, a voltage step-down unit or device and a converter connected to the other or a second terminal of the second relay and the other or a second terminal of the third relay and connected in parallel to each other, a communication voltage output unit or output connected to the other terminal of the second relay and the other terminal of the third relay to output a communication voltage, and a second communication unit or device connected between the communication voltage output unit and the second communication terminal. Therefore, power consumption of the outdoor unit in a standby mode may be reduced.

While the AC power is supplied through the second relay, which may be a start relay, after the second relay is turned off, the third relay may be turned on, and thus, the AC power may be supplied through the third relay. Therefore, during a plug connection after a standby mode is ended, the AC power may be rapidly supplied.

According to embodiments disclosed herein, an air conditioner is provided that may include an indoor unit or device and an outdoor unit or device. The indoor unit may include a first connection unit or connector including a first alternating current (AC) power terminal, a first communication terminal, and a first neutral terminal, a first relay connected between the first AC power terminal and the first communication terminal, and a first communication unit or connector connected to the first communication terminal. The outdoor unit or device may include a second connection unit or connector including a second AC power terminal, a second communication terminal, and a second neutral terminal connected, respectively, to the first AC power terminal, the first communication terminal, and the first neutral terminal, a second relay having one or a first terminal connected to the second AC power terminal, a third relay having one or a first terminal connected to the second AC power terminal and the one terminal of the second relay, a voltage step-down unit or device and a converter connected to the other or a second terminal of the second relay and the other or a second terminal of the third relay and connected in parallel to each other, a communication voltage output unit or output connected to the other terminal of the second relay and the other terminal of the third relay to output a communication voltage, and a second communication unit or device connected between the communication voltage output unit and the second communication terminal. Therefore, power consumption of the outdoor unit in a standby mode may be reduced.

The air conditioner according to embodiments disclosed herein should not be limited to configurations and methods of the above-described embodiments and all or some of the embodiments may be selectively combined with one another to achieve various alterations.

Meanwhile, an operation method of the air conditioner according to embodiments disclosed herein may be implemented as processor-readable code that can be written in a recording medium readable by a processor included in the power conversion apparatus or the air conditioner. The processor-readable recording medium may include any type of recording device in which processor-readable data is stored. Examples of the processor-readable recording medium include a ROM, a RAM, a CD-ROM, a magnetic tape, a floppy disk, an optical data storage device, and a carrier wave (for example, data transmission over the Internet). The processor-readable recording medium may be distributed over computer systems connected to a network so that processor-readable code may be stored therein and executed therefrom in a decentralized manner.

Embodiments disclosed herein provide an air conditioner capable of reducing power consumption of an outdoor unit or device in a standby mode.

In accordance with embodiments disclosed herein, the above and other objects may be accomplished by the provision of an air conditioner including an indoor unit or device and an outdoor unit or device. The indoor unit may include a first connection unit or connector including a first alternating current (AC) power terminal, a first communication terminal, and a first neutral terminal, a first relay connected between the first AC power terminal and the first communication terminal, and a first communication unit or device connected to the first communication terminal. The outdoor unit may include a second connection unit or connector including a second AC power terminal, a second communication terminal, and a second neutral terminal connected, respectively, to the first AC power terminal, the first communication terminal, and the first neutral terminal, a second relay having one or a first terminal connected to the second communication terminal, a third relay having one or a first terminal connected to the second AC power terminal, a voltage step-down unit or device and a converter connected to the other or a second terminal of the second relay and the other or a second terminal of the third relay and connected in parallel to each other, a communication voltage output unit or output connected to the other terminal of the second relay and the other terminal of the third relay to output a communication voltage, and a second communication unit connected between the communication voltage output unit and the second communication terminal.

Embodiments disclosed herein further provide an air conditioner that may include an indoor unit or device and an outdoor unit or device. The indoor unit may include a first connection unit or connector including a first alternating current (AC) power terminal, a first communication terminal, and a first neutral terminal, a first relay connected between the first AC power terminal and the first communication terminal, and a first communication unit or connector connected to the first communication terminal. The outdoor unit may include a second connection unit or device including a second AC power terminal, a second communication terminal, and a second neutral terminal connected, respectively, to the first AC power terminal, the first communication terminal, and the first neutral terminal, a second relay having one or a first terminal connected to the second AC power terminal, a third relay having one or a first terminal connected to the second AC power terminal and the one terminal of the second relay, a voltage step-down unit or device and a converter connected to the other or a second terminal of the second relay and the other or a second terminal of the third relay and connected in parallel to each other, a communication voltage output unit or output connected to the other terminal of the second relay and the other terminal of the third relay to output a communication voltage, and a second communication unit or device connected between the communication voltage output unit and the second communication terminal.

While embodiments have been particularly shown and described with reference to exemplary embodiments thereof, it will be understood by those of ordinary skill in the art that various changes in form and detail may be made herein without departing from the spirit and scope as defined by the following claims and such modifications and variations should not be understood individually from the technical idea or aspect.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising an indoor device and an outdoor device, wherein the indoor device includes:
    a first connector including a first alternating current (AC) power terminal, a first communication terminal, and a first neutral terminal;
    a first relay connected between the first AC power terminal and the first communication terminal; and
    a first communication device connected to the first communication terminal, and wherein the outdoor device includes:
        a second connector including a second AC power terminal, a second communication terminal, and a second neutral terminal connected, respectively, to the first AC power terminal, the first communication terminal, and the first neutral terminal;
        a second relay having a first terminal connected to the second communication terminal;
        a third relay having a first terminal connected to the second AC power terminal;
        a voltage step-down device and a converter connected to a second terminal of the second relay and a second terminal of the third relay and connected in parallel to each other;
        a communication voltage output connected to the second terminal of the second relay and the second terminal of the third relay to output a communication voltage; and
        a second communication device connected between the communication voltage output and the second communication terminal, wherein, in a state in which an AC power is applied through a first power line connected between the first AC power terminal and the second AC power terminal, when the first relay is turned on, the AC power through the first power line is transmitted to the first communication device and the second communication terminal via the first communication terminal from the first AC power terminal, and wherein, when the second relay is turned on, the AC power through the second communication terminal is transmitted to the voltage step-down device and the converter to operate the voltage step-down device and the converter.

2. The air conditioner according to claim 1, wherein, when the second relay is turned off and the third relay is turned on after the voltage step-down device and the converter are operated, the AC power through the first power line is transmitted to the voltage step-down device and the converter via the second AC power terminal and the third relay to operate the voltage step-down device and the converter.

3. The air conditioner according to claim 1, wherein the communication voltage output outputs a communication voltage according to an operation of the voltage step-down device and the converter, and the output communication voltage is transmitted to the first communication device via the second communication device, the second communication terminal, and the first communication terminal.

4. The air conditioner according to claim 1, wherein the indoor device further includes a rectifier connected to the first AC power terminal, and wherein when the second relay is turned off and the third relay is turned on after the voltage step-down device and the converter are operated, the AC power through the first power line is transmitted to the rectifier through the first AC power terminal.

5. The air conditioner according to claim 1, wherein the third relay is a direct current (DC) relay.

6. The air conditioner according to claim 1, wherein the outdoor device further includes a converter controller operated by power received from the voltage step-down device.

7. The air conditioner according to claim 6, wherein the converter controller performs on/off control or operation control of the second relay, the third relay, the voltage step-down device, and the converter, the communication voltage output, and the second communication device of the outdoor device.

8. The air conditioner according to claim 6, wherein the converter controller performs on/off control or operation control of the first relay and the first communication device of the indoor device.

9. The air conditioner according to claim 1, wherein a first power line electrically connected to a power plug is connected between the first AC power terminal and the second AC power terminal, and wherein a second power line electrically connected to the power plug is connected between the first neutral terminal and the second neutral terminal.

* * * * *